J. M. TAYLOR.
RESILIENT TIRE.
APPLICATION FILED NOV. 26, 1915.
1,178,968.  Patented Apr. 11, 1916.
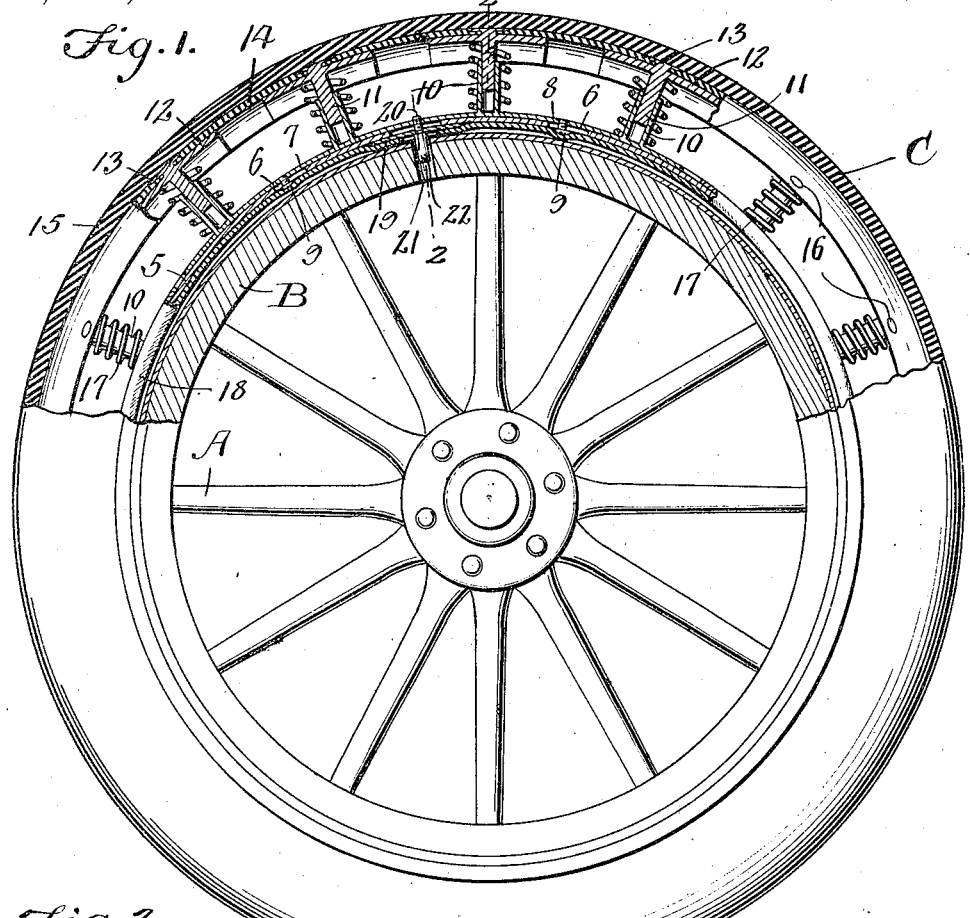
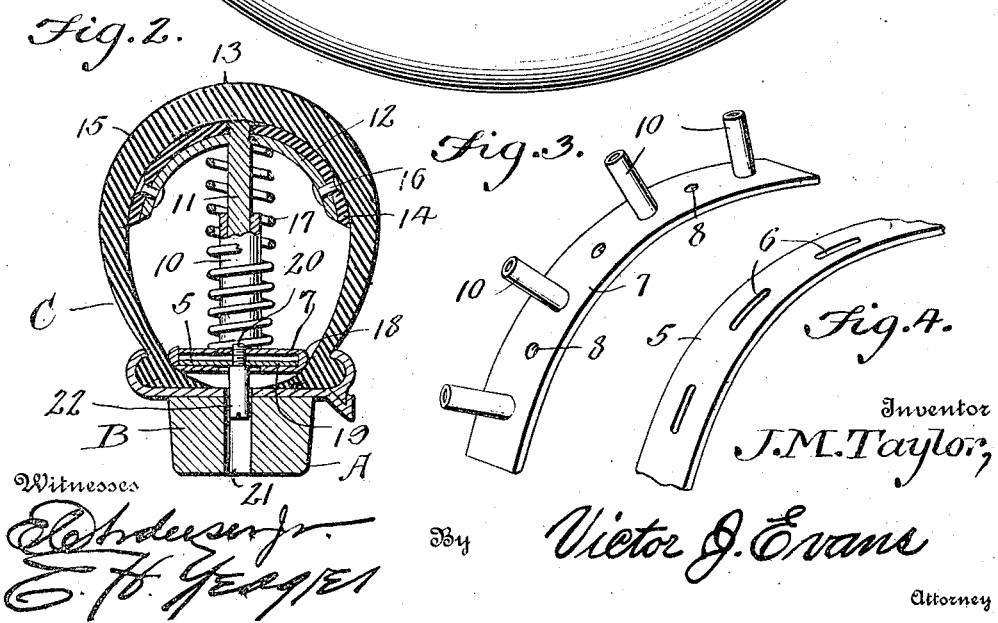

UNITED STATES PATENT OFFICE.

JAMES M. TAYLOR, OF UNO, VIRGINIA.

RESILIENT TIRE.

1,178,968.   Specification of Letters Patent.   Patented Apr. 11, 1916.

Application filed November 26, 1915. Serial No. 63,636.

*To all whom it may concern:*

Be it known that I, JAMES M. TAYLOR, a citizen of the United States, residing at Uno, in the county of Madison and State of Virginia, have invented new and useful Improvements in Resilient Tires, of which the following is a specification.

This invention contemplates the provision of a resilient means for vehicle wheel tires, to take the place of the usual inflatable inner tube, thus producing a tire which is not only puncture-proof, but one possessing all the advantages of the pneumatic tire.

Another object of importance resides in the provision of a novel construction of means for fastening the tire to the rim of the wheel, whereby the tire is capable of being wholly removed from or mounted upon the rim of the wheel when desired, and may therefore be used in the capacity of an emergency tire.

Other objects will appear as the nature of the invention is better understood from the following description, wherein the specific construction, combination and arrangement of parts are more fully set forth and claimed.

In the drawing forming part of this specification like numerals of reference indicate similar parts in the several views and wherein:—

Figure 1 shows a wheel in elevation partly in section with my improved tire thereon. Fig. 2 is a sectional view taken on line 2—2 of Fig. 1. Fig. 3 is a view of one of the ring sections. Fig. 4 is a fragmentary view of the split band.

Referring more particularly to the drawing A indicates generally a vehicle wheel of the ordinary well known construction having the usual felly B, and C the tire constructed in accordance with one embodiment of the invention.

As shown in this particular instance the tire consists of a split band 5 provided with a circumferential series of spaced elongated slots 6, and a ring disposed concentrically about the band and including a plurality of separated sections 7, each provided with a plurality of openings 8 adapted to register with the slots 6. During the initial association of these parts a relatively small screw bolt 9 is passed through the slot 6 of the band 5 and secured within the opening 8 of the ring sections 7, whereby these parts are connected for relative adjustments in the manner and for the purpose to be hereinafter described.

Rising from each of the ring sections 7 is a plurality of socket-like members 10 adapted to slidably receive the studs 11, which latter depend centrally from the arcuate shaped plates 12. Any number of plates 12 may be employed and disposed in suitable spaced relation, there being of course one plate and stud 11 for each of the socket members 10 as shown. The studs 11 are provided with heads 13 that are spaced outward of the plates 12, and serve to effectively clamp therebetween and the said plates a continuous band of rubber or other suitable material 14 which latter wholly covers the plates 12 for the purpose of preventing the plates from coming in direct contact with the tread portion of the casing or shoe 15, the band 14 being further secured to the said plates by means of rivets 16 adjacent the opposite sides thereof. Encircling each associated socket member 10 and stud 11 is a coil spring 17, the innermost convolution of which bears against the ring sections 7 and the outer convolution engaging the inner face of the plate 12, whereby the tread portion of the tire in its entirety is yieldably supported to absorb the shock and vibration of the vehicle incident to its travel over irregular surfaces.

The construction hereinabove described constitutes a resilient means in the nature of a substitute for the inflatable inner tube usually employed with pneumatic tires, and is wholly inclosed by means of the shoe 15. The tire in this respect possesses the same advantages as the pneumatic tire, and an additional advantage of being puncture-proof which eliminates a great deal of trouble and difficulty commonly experienced with pneumatic tires. With a tire of this construction I also make use of a band of leather or other suitable material indicated at 18, which latter is substantially U-shaped in cross section and receives the split band 5 and ring sections 7 as a unit, thereby preventing any metal from coming in contact with the shoe 15 and eliminating undue wear of the latter from this source. Furthermore by reason of its snug engagement with the shoe 15, it materially assists in preventing circumferential movement of the resilient means within the shoe.

In applying the tire to a wheel the split band 5 is either contracted or expanded to accommodate the particular wheel upon which the tire is to be used, it being obvious that during the adjustment of the band 5, the ring sections 7 by reason of the slot and pin connection with the band will move radially with respect to the wheel so as to assume a proper position in fixed relation upon the wheel. Subsequent to this adjustment a plate 19 is arranged beneath the adjacent ends of the band 5, the plate being provided with an opening through which a screw bolt 20 is adapted to be passed, the bolt also having engagement with one of the ring sections 7, so that when the bolt is tightened the band 5 and ring will be frictionally held in fixed relation relatively. It will be noted that the bolt 20 is to be associated with the plate 19 and ring section 7 subsequent to the arrangement of these parts within the shoe 15, and as the tire in its entirety is placed upon the rim, the bolt 20 is passed through the usual opening 21 into the felly that is provided for the reception of the pneumatic valve tube. The bolt 20 is provided with an enlarged head 22 that extends a considerable distance within the opening and coöperates with the leather band 18 to prevent circumferential movement of the tire about the wheel.

It will be manifest that by reason of the construction, and more particularly the means for fastening the tire upon the wheel, that by merely removing the bolt 20 the tire in its entirety may be quickly removed from or mounted upon the rim when desired, in view of which fact the tire may be used in the capacity of an emergency tire.

It is believed that from the foregoing description the nature and advantages of the invention will be readily apparent, although it should be understood that I do not limit myself to the precise construction and arrangement of parts herein shown, as the same is merely illustrative of one embodiment of the invention and that various changes may be resorted to when desired as fall within the scope of what is claimed.

What is claimed is:—

1. A resilient tire for wheels comprising a shoe or casing, a ring, socket members projecting radially therefrom, a plurality of arcuate shaped plates, studs depending from said plates and slidably fitted within said sockets, each of said studs having a head spaced outward of each of said plates, and a flexible band covering said plates and secured therebetween and said heads of the studs, and yieldable means supporting said plates.

2. A resilient tire for wheels comprising a split band, a sectional ring disposed concentrically about said band, a slot and pin connection between the band and ring sections whereby the latter are moved radially with respect to the wheel upon expansion and contraction of said band, means for holding said parts in fixed relation about the periphery of said wheel, a tread member, means yieldably supporting said tread member upon said ring, and a shoe or casing for the tire.

In testimony whereof I affix my signature in presence of two witnesses.

JAMES M. TAYLOR.

Witnesses:
   S. S. KIRKPATRICK,
   M. W. PEREGAY.